Figure 1:
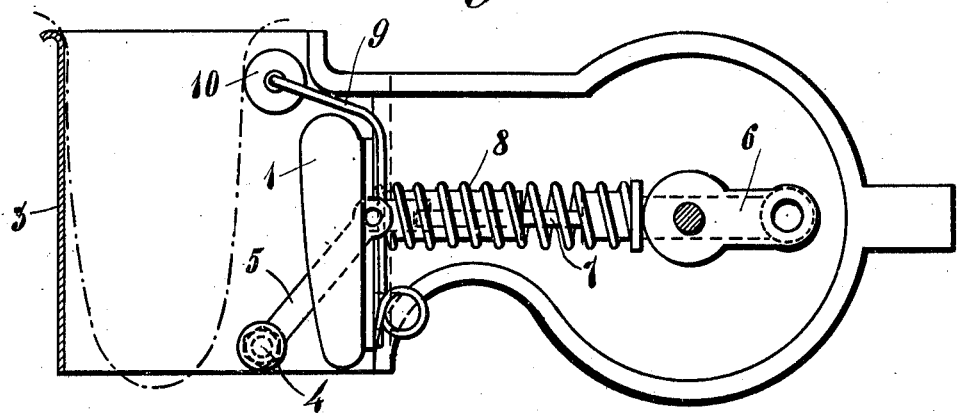

G. E. JONSSON.
MILKING MACHINE.
APPLICATION FILED MAR. 4, 1910.

978,595.

Patented Dec. 13, 1910.

Witnesses:
Aug Sörensen
Gerhard Nordstrand

Inventor:
Gustaf E. Jonsson

UNITED STATES PATENT OFFICE.

GUSTAF EMIL JONSSON, OF NORRKÖPING, SWEDEN.

MILKING-MACHINE.

978,595.  Specification of Letters Patent.  Patented Dec. 13, 1910.

Application filed March 4, 1910. Serial No. 547,267.

*To all whom it may concern:*

Be it known that I, GUSTAF EMIL JONSSON, a subject of the King of Sweden, residing at Norrköping, in the Kingdom of Sweden, have invented new and useful Improvements in Milking-Machines, of which the following is a specification, reference being had to the drawing accompanying and forming a part hereof.

This invention relates to improvements in milking machines of the kind in which the milking is effected by a plate, piston or other clamping member movable toward and away from another clamping member so as to clamp the teat therebetween, and in which the first-mentioned clamping member carries a separate cutting-off member projecting in front of the said clamping member so as to cut off a quantity of milk in the teat, before the latter is clamped between the two clamping members aforesaid.

In the milking machines of this kind hitherto known the cutting-off member is slidably placed in the clamping member so as to move at substantially right angles to the teat. On account thereof the teat will form a fold between the cutting-off member and the clamping member carrying the same, when the said clamping member is pressed onto the teat, by which the teat is liable to be hurt and a satisfactory milking cannot be obtained.

The object of the invention is to remove the said drawback and provide a milking machine which will work in all respects quite satisfactorily.

The invention consists, chiefly, in the combination of a clamping member, a cutting-off member placed at the top thereof for cutting off the interior of the teat from the udder, and means for supporting the said cutting-off member in such a manner as to cause the same to describe a path in an upward and rearward direction relatively to the clamping member, when the latter is pressed onto the teat.

The invention further comprises the construction and combination of parts hereinafter more particularly described.

In the drawing, I have shown a milking machine embodying the invention.

Figure 2:
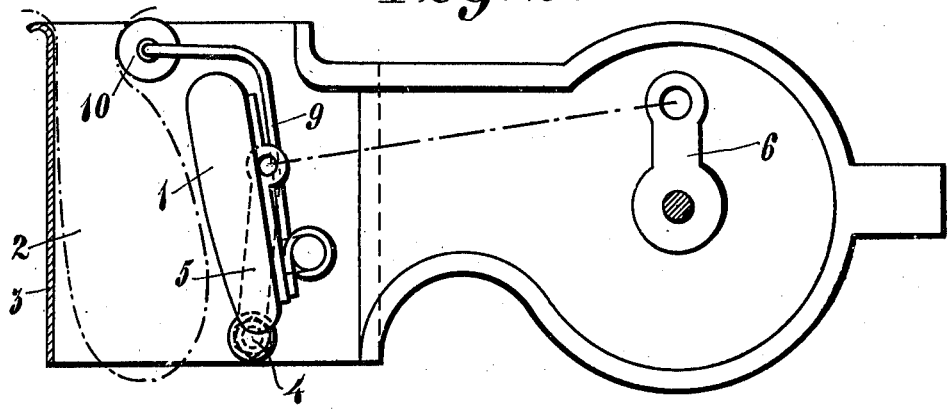
Figure 3:
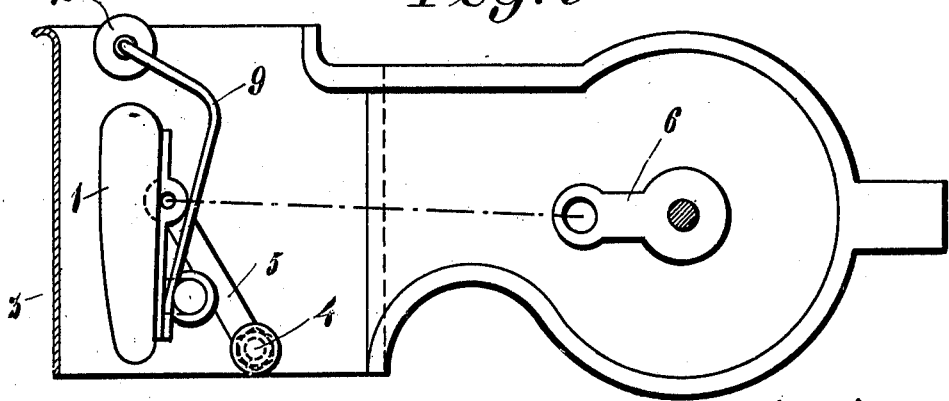

Figure 1 is a vertical section of the machine, and Figs. 2 and 3 are similar views with the parts in different positions.

Referring to the drawing, the milking machine comprises a clamping member, preferably a plate or piston 1 movable toward and away from the teat 2 so as to be able to clamp the same against the wall 3 of the teat cup. The plate 1 is carried by two arms 5 adapted to swing about pivots 4 so as to cause the plate to move along a circular arc. It is driven in any suitable way, for instance by a crank 6 connected to the plate by means of a connecting-rod 7. The connecting-rod suitably consists of two parts movable one within the other and kept apart by means of a spring 8, thus securing a yielding pressure against the teat.

Attached to the lower rear part of the plate 1 is a spring 9, and carried by the said spring, at the upper part thereof, is a cutting-off member, preferably in the shape of a roller 10. The spring 9 is bent in such a manner that, when the roller 10 does not press on the teat (Fig. 1), it is a short distance in advance of the plate 1 so as not to engage the teat until the plate moves toward the same. When the roller 10 has engaged the teat, it compresses the upper part thereof (Fig. 2) so as to cut off the interior of the teat from the udder. The plate 1 thereupon presses on the teat (Fig. 3) so as to squeeze out the milk therefrom. During this movement of the plate 1 the spring 9 is pressed backward, as clearly shown in Fig. 3, but all the time keeps the roller 10 pressed onto the upper part of the teat. When the crank has passed its dead point and commences to pull the plate 1 away from the teat, the roller 10 at first continues to press on the teat but is soon withdrawn by the plate the upper edge of which engages the spring 9 (Fig. 1).

It appears from the aforesaid that the roller 10 will effectively cut off the interior of the teat from the udder and will at the same time cause the part of the teat between the roller 10 and the plate 1 to be stretched. On account of the plate 1 being caused by the arms 5 to move along a circular arc, it will move somewhat downward during the last part of its movement against the teat, and it will thus partake in the movement of the teat lengthening itself during the compressing action thereon.

I wish it to be understood that the invention is not limited to the precise details of construction hereinbefore described with reference to the drawing but may be varied considerably and in many respects without departing from the principles hereinbefore set forth. Thus, for instance, the plate 1 may be driven by a cam, instead of by a crank-shaft, in which case the retraction of the plate may be effected by a spring or in other suitable way.

I claim:

1. In a milking machine, the combination of a clamping member, a cutting-off member placed at the top thereof for cutting off the interior of the teat from the udder, and means for supporting the said cutting-off member in such a manner as to cause the same to describe a path in an upward and rearward direction relatively to the clamping member, when the latter is pressed onto the teat.

2. In a milking machine, the combination of a clamping member, a cutting-off member placed at the top thereof for cutting off the interior of the teat from the udder, and means for connecting the said cutting-off member to the said clamping member in such a manner as to cause the same to describe a path in an upward and rearward direction relatively to the clamping member, when the latter is pressed onto the teat.

3. In a milking machine, the combination of a clamping member, a spring attached to the said clamping member, and a cutting-off member carried by the said spring in such a manner as to swing upwardly and rearwardly relatively to the said clamping member, when the latter is pressed onto the teat.

4. In a milking machine, the combination of a clamping member, a spring attached to the said clamping member, at the back thereof, and a cutting-off member carried by the said spring in such a manner as to swing upwardly and rearwardly relatively to the said clamping member, when the latter is pressed onto the teat.

5. In a milking machine, the combination of a clamping member, a roller placed at the top and somewhat in front thereof for cutting off the interior of the teat from the udder, and means for supporting the said roller in such a manner as to cause the same to describe a path in an upward and rearward direction relatively to the clamping member, when the latter is pressed onto the teat.

6. In a milking machine, the combination of a clamping member, a cutting-off member placed at the top thereof for cutting off the interior of the teat from the udder, means for connecting the said cutting-off member to the said clamping member in such a manner as to cause the same to describe a path in an upward and rearward direction relatively to the clamping member, when the latter is pressed onto the teat, and means for guiding the clamping member in such a manner as to cause the same with the cutting-off member to move downward during the last part of the pressing action on the teat.

7. In a milking machine, the combination of a clamping member, a cutting-off member placed at the top thereof for cutting off the interior of the teat from the udder, means for connecting the said cutting-off member to the said clamping member in such a manner as to cause the same to describe a path in an upward and rearward direction relatively to the clamping member, when the latter is pressed onto the teat, and links connected to the clamping member for causing same to swing downward during the last part of its pressing action.

GUSTAF EMIL JONSSON.

Witnesses:
AUG. SÖRENSEN,
GERHARD NORDSTRAND.